Jan. 18, 1955    J. H. BAKER    2,699,646
GAS TURBINE POWER PLANT HAVING VARIABLE EXHAUST
AREA AND CONTROL SYSTEM THEREFOR
Filed June 30, 1949    2 Sheets-Sheet 2
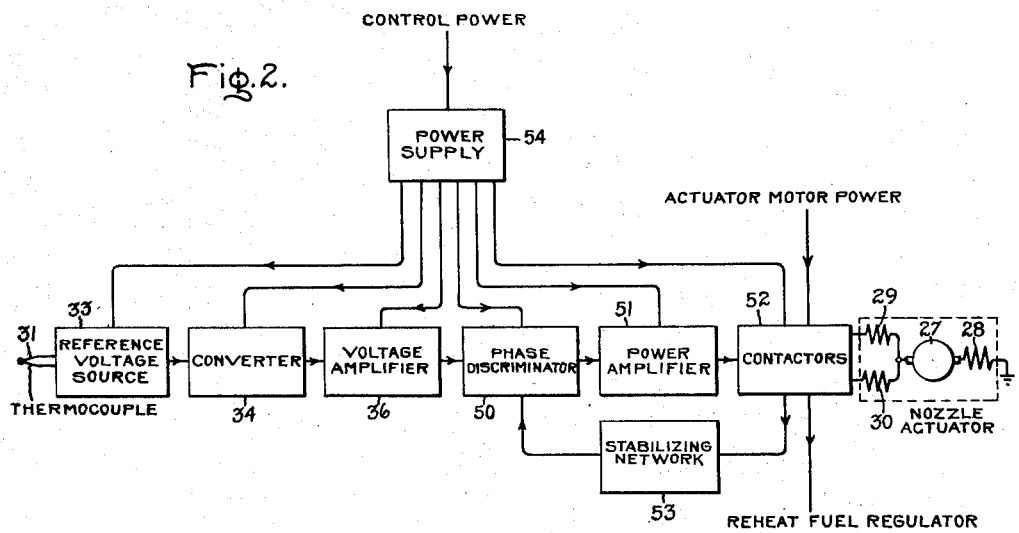
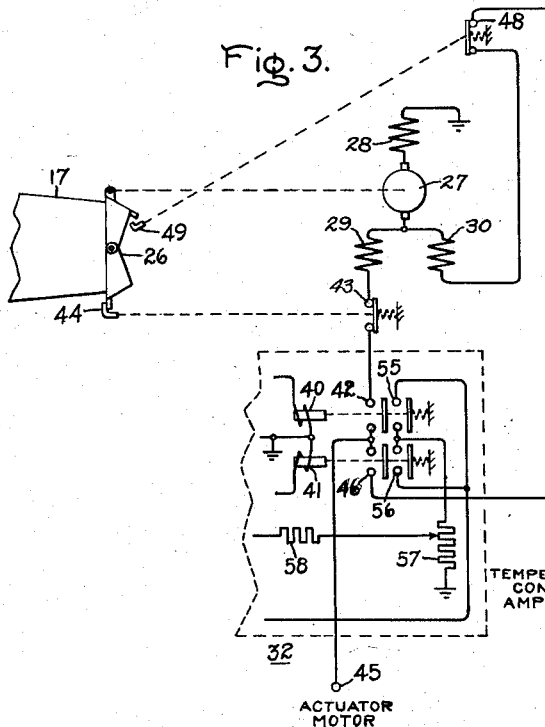
Inventor:
John H. Baker,
by *Crowell & Mack*
His Attorney.

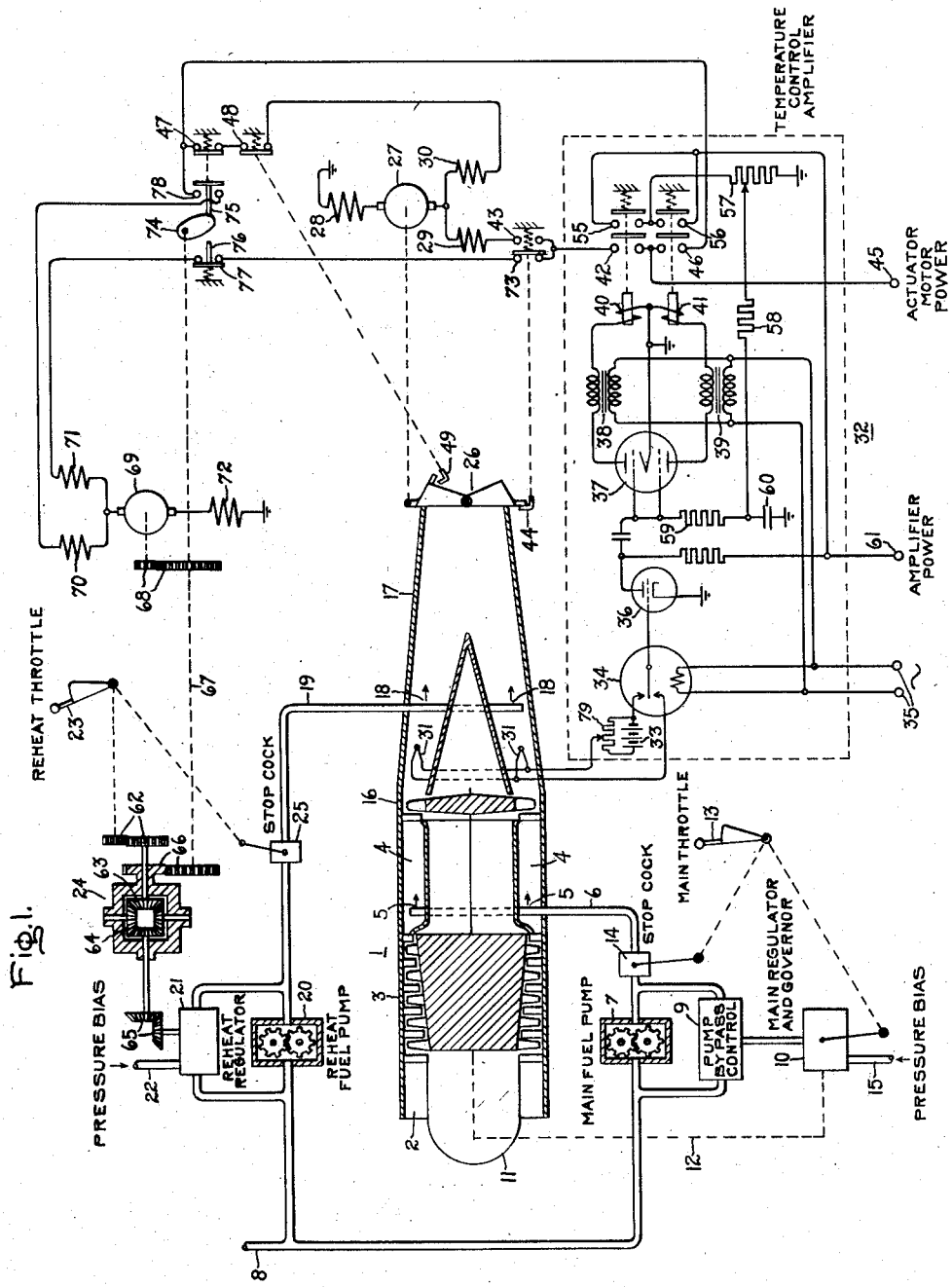

United States Patent Office 2,699,646
Patented Jan. 18, 1955

2,699,646

GAS TURBINE POWER PLANT HAVING VARIABLE EXHAUST AREA AND CONTROL SYSTEM THEREFOR

John H. Baker, San Diego, Calif., assignor to General Electric Company, a corporation of New York Application June 30, 1949, Serial No. 102,387

11 Claims. (Cl. 60—35.6)

This invention relates to control systems for gas turbine power plants and more particularly to a control system for regulating the turbine discharge temperature of an aircraft gas turbine power plant having exhaust reheating or other means for augmentation of thrust.

A gas turbine power plant for the propulsion of aircraft may include an air compressor for initially increasing the pressure of the incoming air, combustion apparatus for burning fuel in the compressed air, and a gas turbine arranged in series flow relation with the compression and the combustion apparatus through which the hot, high pressure gas generated by the compressor and combustion apparatus is expanded. The turbine extracts at least sufficient power from these gases to drive the compressor and the power remaining may be used to produce thrust for propelling the aircraft by discharging the gases exhausted from the turbine rearwardly through a suitable nozzle. Aircraft gas turbine power plants of this type are more particularly described in Patent 2,432,359 to Dale D. Streid, and in application Serial No. 541,565, filed June 22, 1944, of Alan Howard, both assigned to the assignee of the present application In the design of gas turbine power plants, particularly for high performance aircraft, it may be desirable to provide means for augmenting the thrust during short periods of time. Various methods for augmenting thrust have been utilized including water injection and exhaust reheating.

In the exhaust reheating cycle, described in co-pending application Serial No. 80,696, filed Mar. 10, 1949, in the name of Edward Woll and assigned to the assignee of the present application, additional fuel is injected down-stream from the turbine and burned in the tail pipe. The thrust available for propelling the aircraft is a function of the velocity of the hot gases flowing through the nozzle at the rear of the power plant and, thus, the thrust may be augmented by increasing the velocity of the flow of hot gases through the nozzle. This increase in velocity is effected by the tailpipe fuel burning which increases the temperature of the hot gases after they are discharged from the turbine and prior to the final discharge from the propelling nozzle. This tailpipe burning may yield a nozzle discharge gas temperature which can approach 3,000° F. The resulting high velocity of the gas discharged through the jet nozzle can produce a net thrust increase or augmentation of up to 45% at take off and 90% in high speed flight.

The tailpipe fuel burning does not directly affect the temperature of the gas discharged at the turbine since the burning takes place some distance downstream. However, assuming a fixed area jet nozzle, the increase in discharge gas temperature in the tailpipe by virtue of the tailpipe fuel burning is accompanied by an increase in the static pressure of the gas in the tailpipe proportional to the temperature increase. This increase in discharge gas pressure results in a decrease in the pressure drop across the turbine which tends to decrease the turbine speed. Since most aircraft gas turbines of the type here considered are provided with governors, the decrease in turbine speed will cause the governor to increase the fuel flow to the combustion apparatus so as to return the turbine speed to the desired value. The increase in fuel flow to the main combustion apparatus produces a proportionate increase in the temperature of the gas passing through the turbine so that a turbine discharge gas temperature of 2,000° F. or higher may result by virtue of the tailpipe reheat fuel burning when a fixed area jet nozzle is utilized. This high gas temperature at the turbine may be detrimental to the turbine structure and it is, therefore, desirable to provide means for insuring that the turbine discharge gas temperature does not vary from a constant predetermined safe level.

It has been found that the turbine discharge temperature can be controlled by varying the area of the jet nozzle. Increasing the area of the jet nozzle reduces the static pressure of the gas in the tailpipe thus reducing the back pressure on the turbine, which in turn produces a tendency for the turbine to over speed with a resultant reduction in fuel flow to the combustion apparatus as a result of the action of the governor. Thus, the turbine discharge temperature is maintained at the proper level with a new thrust level, however, being produced by virtue of the reheat fuel burning in the tailpipe.

It is, therefore, desirable to vary the area of the jet nozzle in accordance with the turbine discharge temperature to insure that the discharge temperature does not vary from a predetermined constant value during tailpipe reheat fuel burning. Furthermore, it may be desirable to modulate the flow of reheat fuel in accordance with the turbine discharge temperature when the maximum area of the jet nozzle has been reached. It may also be desirable to utilize a variable area jet nozzle actuated in accordance with the turbine discharge temperature in gas turbine power plants employing no thrust augmentation system since the turbine discharge temperature may become excessive.

An object of this invention is to provide an improved control system for a gas turbine power plant.

Another object of this invention is to provide an improved control system for a gas turbine power plant whereby the turbine discharge temperature does not vary from a predetermined constant value.

A further object of this invention is to provide an improved control system for aircraft gas turbines having means for augmenting thrust whereby the jet nozzle area is controlled so that the turbine discharge temperature does not vary from a predetermined constant value during augmentation.

A still further object of this invention is to provide an improved control system for aircraft gas turbines having reheat fuel burning for augmentation of thrust whereby the jet nozzle area is controlled in accordance with the turbine discharge temperature.

A still further object of this invention is to provide an improved control system for aircraft gas turbine power plants having reheat burning of fuel for augmentation of thrust wherein the jet nozzle area is controlled in accordance with turbine discharge temperature and the reheat fuel flow is modulated in accordance with the turbine discharge temperature when the maximum jet nozzle area has been reached.

Further objects and advantages of this invention will become apparent and the invention will be better understood from the following description referring to the accompanying drawings, and the features of novelty which characterize the invention will be pointed out with particularity in the claims annexed to and forming part of this specification.

In accordance with one aspect of this invention, an aircraft gas turbine having tailpipe reheat fuel burning for augmentation of thrust is provided with a variable jet nozzle and an actuator mechanism for moving said nozzle. Means such as thermocouples are positioned in the tailpipe intermediate the turbine and the point of introduction of reheat fuel for sensing the turbine discharge temperature. The signal from the thermocouples is compared with a reference temperature signal and the resultant error signal is amplified to energize the variable area jet nozzle actuator. Thus, an increase in turbine discharge temperature produced by reheat fuel burning is accompanied by an increase in jet nozzle area so that the turbine discharge temperature does not vary from a predetermined constant value. A further aspect of this invention provides for the transfer of the temperature error signal from the variable area jet nozzle actuator to the reheat fuel regulator when the maximum area of the jet nozzle has been reached.

In the drawing, Fig. 1 is a schematic illustration of an aircraft gas turbine provided with the improved control system of this invention; Fig. 2 is a schematic illustration of a temperature control amplifier which may be used to energize the nozzle actuator in accordance with the turbine discharge temperature; and Fig. 3 is a fragmentary schematic illustration illustrating the control of jet nozzle area alone without provision for modulation of the reheat fuel when the maximum limit of the jet nozzle area has been reached.

Referring now to Fig. 1, there is shown an aircraft gas turbine, generally identified as 1. Air is drawn in at inlet 2 and is compressed by compressor 3. The main fuel is introduced in combustion chambers 4 by suitable nozzles 5, which are connected in parallel flow relation to a common fuel manifold 6. The fuel is conveyed to the nozzles 5 by a suitable pump 7 from a fuel supply 8. The output of the pump 7 is modulated by a pump by-pass control 9 which is controlled by a regulator and speed governor mechanism 10. The speed governor portion of the regulator 10 is driven from the gear case 11 of the turbine 1 by a shaft shown schematically at 12. The control shaft of the regular 10 is linked in any suitable manner to the main throttle 13. The main throttle 13 is also linked to a shut-off valve 14 in the manifold 6.

In gas turbine power plants intended for use at seat level or at a substantially constant altitude, it is a relatively simple matter to supply the fuel requirements of the engine. However, in aircraft service, where the engine is required to operate over a wide range of altitude and where the fuel requirements vary as a function of the altitude, it is desirable to provide compensation to limit the output of the fuel pump in accordance with a preselected function of the atmospheric or some other pressure. Thus, the main fuel regulator 10 is provided with pressure compensation from any desired source, as shown at 15.

After the input air has been compressed by the compressor 3 and heated in the combustion chambers 4, it is expanded through the turbine 16 which drives the compressor 3. The hot gases discharged from the turbine 16 are exhausted through the tail pipe 17 and provide the thrust for propelling the aircraft.

In order to provide for reheat augmentation of the thrust, additional fuel is introduced into the tailpipe 17 through suitable nozzles 18 which are connected in parallel flow relation to a common fuel manifold 19. The reheat fuel is conveyed to the tailpipe nozzles 18 by a suitable pump 20, from the common fuel supply source 8, or alternately, from a separate supply source. The output of the pump 20 is modulated by a reheat fuel regulator 21, which includes a pump by-pass valve. Regulator 21 is also provided with suitable pressure bias, as at 22. The control shaft of the reheat fuel regulator 21 is linked to the reheat throttle 23 through a differential 24, as will be hereinafter described. The reheat throttle 23 is also connected to a stop cock 25 in the fuel manifold 19.

When the reheat fuel from the tailpipe nozzles 18 is burned in the tailpipe 17, the temperature of the gas in the tailpipe is increased accompanied by an increase in the static pressure of the gases in the tailpipe 17. This increase in static discharge gas pressure reduces the pressure drop across the turbine 16 tending to decrease its speed. The speed governor portion of the regulator 10 raises the main fuel flow through the nozzles 5 to return the speed to the correct value. The increased fuel to air ratio in the combustion chambers 4 results in an increase in the temperature of the gas discharged from the turbine 16, which temperature may be destructive of the turbine blades.

In order to reduce the excessive temperature of the gas discharged from the turbine 16 as a result of the burning of reheat fuel in the tail pipe 17, the arrangement now to be described is provided. The tail pipe 17 is provided with a suitable variable area jet nozzle 26 which is actuated by a suitable nozzle actuator mechanism such as a series drive motor 27 having a series clutch-brake coil 28 and two series fields 29 and 30 for either direction of rotation. However, it will be readily understood that the variable area jet nozzle 26 may be actuated by a hydraulic actuator or other servo mechanism. One or more low time constant temperature sensing units, such as thermocouples 31 are positioned in the tailpipe 17 intermediate the turbine 16 and tailpipe burning nozzles 18. The thermocouples 31 measure substantially the average temperature of the gas discharged from the turbine prior to the introduction of the reheat fuel. The signal from the thermocouples 31 is received by a temperature control unit, generally identified as 32, which energizes the nozzle actuator motor 27 responsive to the discharge temperature of the turbine 16 so that the variable jet nozzle 26 is opened responsive to an increase in the discharge temperature or closed responsive to a decrease. Control unit 32 may be alternatively referred to below as a regulator.

In the event that the temperature sensing elements are thermocouples, it may be found desirable to compare the temperature signal from the thermocouples with a reference temperature signal, to amplify the error signal, and to use the amplified error signal to energize the nozzle actuator motor 27. In such a system, the thermocouples 31 are arranged in series with a constant reference voltage source which may comprise potentiometer 79 and battery 33. Thus, the direct current signal from the thermocouples 31 is compared with the voltage of the reference voltage source which corresponds to the desired turbine discharge temperature and the result of this comparison, a plus or a minus or a zero error signal is converted to direct current pulses by converter 34. Converter 34 may be a simple vibrator unit operated from a source of alternating current 35 so that a plus direct current error signal is changed to a series of plus pulses of the same frequency as the frequency of the alternating current source 35 while a minus error signal will be changed to a corresponding series of minus pulses displaced in phase by 180° from the plus pulses. Converter 34, therefor, may also be described as an inverter. The plus or minus pulses are impressed on the grid of voltage amplifier 36 and the amplified error signal which is of one phase for a plus error signal and phase displaced by 180° for a minus error signal is impressed on both grids of a dual tube 37. The plates of the tube 37 are respectively arranged in series with the secondaries of transformers 38 and 39, the primaries being energized from the source of alternating current 35. Also respectively arranged in series with the plates of the tube 35 and the secondaries of the transformers 38 and 39 are relay coils 40 and 41. The tube 37 and the transformers 38 and 39 comprise a phase discriminator in which the amplified plus or minus error signal is compared with the alternating current source 35. The resultant phase signal will energize either relay coil 40 responsive to a plus error signal or relay coil 41 responsive to a minus error signal. Contacts 42, actuated by the relay coil 40, and normally closed contacts 43 of maximum open limit switch 44 of the variable area jet nozzle 26 are arranged in series with field winding 29 of nozzle actuator motor 27 and a source of actuator motor power 45.

It will now be seen that an increase in reheat fuel flow called for by the reheat throttle 23 will result in an immediate tendency for the temperature of the gas discharge from the turbine 16 to increase. Any slight increase in turbine discharge temperature above the reference level established by the constant voltage source is sensed by the thermocouples 31 and results in a plus error signal which energizes relay coil 40 closing contacts 42. Assuming that the variable area jet nozzle 26 has not reached its maximum open position and that, therefore, limit switch contacts 43 are still closed, the field winding 29 of the nozzle actuator motor 27 will be energized. This causes the nozzle actuator motor 27 to start to open the variable area jet nozzle 26. When the variable area jet nozzle 26 has opened a sufficient amount to return the turbine discharge temperature to the desired value, a zero error signal will be impressed on the converter 34 causing the relay coil 40 to be deenergized opening the contacts 42 to stop the nozzle actuator motor 27. When the clutch-brake coil 28 is deenergized, a brake mechanism (not shown) quickly stops the nozzle actuator motor 27.

Relay coil 41, which is energized responsive to a minus temperature error signal, actuates contacts 46. The contacts 46 normally closed contacts 47 of a circuit to be hereinafter described, and normally closed contacts 48 of maximum closed limit switch 49 of the variable area jet nozzle 26 are arranged in series with field winding 30 of the nozzle actuator motor 27 and the source of actuator motor power 45. Thus, a minus error signal responsive to a tendency for the turbine discharge gas to decrease temperature produced by a decrease in reheat fuel flow, will energize relay coil 41 closing contacts 46. Assuming that the maximum closed position of the variable area jet nozzle 26 has not been reached so that the contacts 48 of the limit switch 49 are still closed and that the contacts 47 are closed, the field winding 30 will be energized so that the nozzle actuator motor 27 starts to close the variable area jet nozzle 26. In this case also, when the temperature of the turbine discharge gas equals the reference temperature, a zero error signal will result which deenergizes relay coil 41, opening contacts 46 and stopping the nozzle actuator motor 27.

It will be readily apparent that the action of the temperature control amplifier unit 32 to energize the nozzle actuator motor 27 for opening or closing the variable area jet nozzle 26 occurs substantially simultaneously with the tendency for the temperature of the turbine discharge gas to increase or decrease. Thus, a tendency for the turbine discharge gas temperature to increase or decrease is substantially simultaneously accompanied by a corresponding increase or decrease in the area of the variable area jet nozzle 26 so that the temperature increase or decrease is wiped out to maintain the turbine discharge temperature at substantially a constant level.

The arrangement of components of amplifier 32 is shown in block diagram form in Fig. 2. As described above, the thermocouples 31 are arranged in series with the reference voltage source 33 and the converter 34. The output of the converter 34 is fed to the voltage amplifier 36 and its output is fed to the phase discriminator 50 which includes the discriminator tube 37 and transformers 38 and 39 of Fig. 1. The output of the discriminator unit 50 may preferably be amplified by a power amplifier 51 (not shown in Fig. 1) which in turn energizes the contactors 52 which comprise the relay coils 40 and 41 and their corresponding contacts. The power requirements of the temperature control amplifier 32 may be supplied by a power supply unit 54.

It is desirable to provide a stabilizing network 53 between the contactors 52 and the phase discriminator 50 to match the action of the temperature control amplifier unit 32 to the time constants of the gas turbine 1. As shown in Fig. 1, the stabilizing network may include contacts 55 and 56, respectively, actuated by the relay coils 40 and 41, a variable stabilizing resistor 57, and a series resistor 58 connected between resistor 59 and capacitor 60, and the source of amplifier power 61. Thus, when relay coil 40 is energized responsive to a plus error signal contacts 55 are closed in addition to contacts 42 placing a predetermined voltage across the capacitor 60 determined by the setting of potentiometer 57.

The values of the capacitor 60 and resistors 57 and 58 are proportioned so that the time constant of this RC circuit approximates the combined time constants of the engine and control system including; the gas turbine, the governor and main fuel system, the thermocouples, and the rate of tailpipe pressure change produced by the outputs of the control system, i. e. nozzle area and reheat fuel flow, which time constants are dependent upon the prevailing flight conditions including altitude, air speed, etc. The potentiometer 57 is set so that the feedback voltage taken therefrom is of the proper value to obtain the correct drop out time to equal the time constants enumerated above. It may be further desirable to provide two separate RC time constants; one during the period that the temperature control amplifier is used to control the variable area jet nozzle 26, and the other during the period that the temperature control amplifier is used to control the reheat fuel, as will be described hereinafter. Provision can be made for applying two different potentiometer voltages to the same RC network for the two different types of operation or two separate potentiometers and two RC networks may be used. In addition, it may be desirable to adjust the stabilizing signal to the flight condition and to secure this result the potentiometer 57 may be connected to a device responsive to an appropriate pressure such as a compressor inlet pressure or compressor discharge pressure.

Thus, a voltage is impressed on the grids of the tube 37 which tends to oppose the error signal. A similar action, of course, takes place when contacts 56 are reclosed by the action of relay coil 41 responsive to a minus error signal.

The amplifier 32, described above, is shown and described in a more elaborate form in copending application Serial No. 102,226, filed June 30, 1949, by Ernest J. Jackson and Alan J. Gardiner, and assigned to the same assignee as the present application. The stabilization circuit of this amplifier, including potentiometer 57 and capacitor 60, forms a portion of the subject matter of the Jackson and Gardiner application.

With a system as thus far described, the "dry" or unaugmented engine may be operated on temperature control at maximum thrust. When the engine is first started, the turbine temperature will be lower than the reference temperature causing the variable area jet nozzle 26 to go fully closed to the limit switch 49. The variable area jet nozzle 26 then remains in the fully closed position until the turbine discharge temperature exceeds the reference temperature at which time the resultant plus error signal causes the nozzle actuator motor 27 to open the variable area jet nozzle 26 a sufficient amount to maintain the temperature at the reference level. This action may take place prior to the beginning of augmented operation. The first few degrees of advance of the reheat throttle 23 opens a valve to a pilot burner (not shown) and switches on the pilot burner ignition (also not shown) for the reheat nozzles 18. As the reheat throttle advance is continued, the reheat stop cock 25 is opened and the reheat fuel regulator 21 will begin to increase the fuel flow to the reheat fuel nozzles 18. The resultant tendency for the turbine discharge temperature to increase is sensed by the thermocouples 31 causing the nozzle actuator motor 27 to drive the variable area jet nozzle 26 open still further to continue to maintain the turbine discharge temperature at the reference level.

It may be found desirable to arrange the reheat fuel regulator 21 so that more reheat fuel will be delivered at the full reheat throttle position than can be burned in the reheat nozzles 18, under all conditions, with the maximum area of the jet nozzle 26 without exceeding the reference temperature. In this situation, a plus error signal will remain in the temperature control amplifier unit 32 after the maximum area of the jet nozzle 26 has been reached. It is, therefore, desirable to transfer this plus error signal to the reheat fuel regulator 21 so that the reheat fuel flow can be reduced responsive to the plus error signal remaining after the maximum area of the variable area jet nozzle 26 has been reached. To accomplish this result, the reheat throttle 23 is linked, for instance through gears 62 to input gear 63 of the differential 24. The output gear 64 of the differential 24 is linked, as by gears 65 to the control shaft of the reheat fuel regulator 21. The cage of the differential 24 is linked, as by gears 66, shaft 67 and gears 68 to series reheat regulator motor 69 which is provided with series field exciting windings 70 and 71 and a clutch-brake coil 72. Thus, when the reheat regulator motor 69 is not operated to drive the cage of the differential 24, movement of the reheat throttle 23 is transmitted through the differential 24 to directly operate the control shaft of the reheat fuel regulator 21.

When the variable area jet nozzle 26 reaches its maximum open position, it operates limit switch 44 opening the normally closed contacts 43 and closing normally opened contacts 73. The reheat regulator actuator motor 69 is arranged to produce a maximum limit of rotation of the cage, for instance by means of a cam 74 on the drive shaft 67 which actuates limit switches 75 and 76. Assuming that the cam 74 is in the position to actuate limit switch 75, normally closed contacts 77 of limit switch 76 will still be closed. Thus, if the advance of the reheat throttle is continued past the point when the maximum open position of the variable area jet nozzle 26 has been reached, and if there is still a tendency for the turbine discharge gas temperature to increase, the remaining plus error signal will keep the contacts 42 of the relay coil 40 closed so that the field winding 71 of the reheat regulator actuator motor 69 will be energized from the source of actuator motor power 45 through contacts 42, 73 and 77. Thus, the reheat regulator actuator motor 69 will be operated to drive the cage of the differential 24 in the proper direction to override or wipe out the advance of the reheat throttle 23 so that the reheat fuel regulator 21 is operated to produce the proper reheat at fuel flow to maintain the turbine discharge temperature at the reference level.

Any movement of the reheat regulator actuator motor 69 to override the advancing motion of the reheat throttle 23 responsive to a plus error signal on the relay coil 40 causes the cam 74 on the shaft 67 to move away from the limit switch 75 opening the contacts 47 in the circuit of the field winding 30 of the nozzle actuator motor 27 and closing contacts 78 in the circuit of the field exciting winding 70 of the reheat regulator actuator motor 69. Continued advance of the reheat throttle 23 is accompanied by continued operation of the reheat regulator actuator motor 69 driving the cage of the differential 24 to override the increased reheat fuel flow called for by the reheat throttle 23 to maintain the turbine discharge temperature constant. The limit switch 76 is actuated by the cam 74 to open the contacts 77 to stop the reheat regulator actuator motor 69 at a predetermined minimum fuel flow.

It will now be readily apparent that a minus error signal which would normally cause energization of the field exciting winding 30 of nozzle actuator 27 to decrease the area of the variable area jet nozzle 26 is transferred to the field exciting winding 70 of the reheat regulator actuator motor 69. Thus, if the reheat throttle 23 is retarded producing a tendency for the turbine discharge temperature to decrease, the resultant minus error signal energizes relay coil 41 closing contacts 46 and the field exciting winding 70 of the reheat regulator motor 69 is energized by the actuator motor power 45 through the contacts 46 and 78. The reheat regulator actuator motor 69 then operates to drive the cage of the differential 24 in the opposite direction to override the retarding action called for by the reheat throttle 23 to maintain the reheat fuel flow at the proper value to keep the turbine discharge temperature at the reference level. When the reheat regulator actuator motor 69 has completed its limit of travel, the cam 74 actuates the limit switch 75 opening the contacts 78 and closing the contacts 47, thus, transferring the control to the nozzle actuator motor 27. Continued retardation of the reheat throttle 23 producing a minus error signal is then accompanied by operation of the nozzle actuator motor 27 to decrease the area of the variable area jet nozzle 26 to maintain the turbine discharge temperature at the reference level.

Referring now to Fig. 3 in which like elements are indicated by like reference numerals, there is shown schematically the circuit arrangement wherein the temperature error signal from the temperature control amplifier 32 is used only to vary the area of the variable area jet nozzle 26 and is not transferred to the reheat fuel regulator 21 when the maximum area of the variable area jet nozzle 26 has been reached. In this case, when the variable area jet nozzle 26 is driven to its maximum open position by the nozzle actuator motor 27, the maximum open limit switch 44 is operated opening the contacts 43 and stopping the motor. Thereafter, a minus error signal responsive to a tendency for the turbine discharge temperature to decrease causes relay coil 41 to close contacts 46 energizing field exciting winding 28 through the maximum closed limit switch contacts 48. This arrangement may be utilized in a gas turbine power plant where the maximum reheat fuel flow delivered at full reheat throttle position with the maximum area of the jet nozzle 26 will not produce a temperature exceeding the reference temperature.

It may be found desirable to utilize temperatures other than the turbine discharge temperature, such as turbine inlet temperature, to control the area of the variable area jet nozzle and to override the called for reheat fuel flow. The potentiometer 79 across the battery 33 may be connected to a manual control in the pilot's cockpit thus enabling the pilot to control the thrust of the "dry engine" by setting a lower reference voltage and, therefore, a lower control temperature.

It will now be readily apparent that the control system described herein provides the optimum jet nozzle area for maximum thrust during "dry" engine operation and, in addition insures that the turbine discharge temperature does not vary from a predetermined constant value during reheat fuel burning. Furthermore, if the reheat nozzles do not light or are in some way extinguished, the jet nozzle area will automatically assume a value which will never give less than the maximum "dry" engine thrust.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of the invention.

What I claim as new and desire to secure by Letters Patent of the United States is:

1. In an aircraft gas turbine power plant having tailpipe reheat fuel burning for augmentation of thrust, means for varying the flow of said reheat fuel, means for varying the area of the jet nozzle of said tailpipe, means for sensing the discharge temperature of said turbine ahead of the introduction point of the reheat fuel, and means operable in response to a signal from said sensing means for actuation of said jet nozzle varying means for opening or closing thereof proportional to an increase or decrease in said turbine discharge temperature from a predetermined desired level to maintain said desired temperature during augmentation, and means operable at the maximum attainable nozzle area to connect said actuation means to control said reheat fuel varying means to modulate the flow of said reheat fuel.

2. In an aircraft gas turbine power plant having tailpipe reheat fuel burning for augmentation of thrust, means for regulating the flow of said reheat fuel, manual means for adjusting said regulating means, means for varying the area of the jet nozzle of said tailpipe, means including a plurality of thermocouples positioned in said tailpipe intermediate said turbine and the point of introduction of the reheat fuel for sensing the discharge temperature of said turbine, means for operating said jet nozzle area varying means, means for comparing a reference temperature signal with the signal from said thermocouples to produce an error signal proportional to the variation of said turbine discharge temperature from said reference temperature, means responsive to said error signal for energizing said operating means to open or close said jet nozzle area varying means proportional to an increase or decrease of said turbine discharge temperature to maintain said turbine discharge temperature at a predetermined constant level during augmentation, means for operating said regulating means to override the fuel flow called for by said manual means, and means connecting said energizing means to control said lastmentioned operating means to modulate the flow of said reheat fuel responsive to said error signal when the maximum limit of said jet nozzle area has been reached.

3. A control system for a thermal powerplant having a variable exhaust area, including exhaust area varying means, means for sensing a temperature within said powerplant, regulating means connected for operation in response to said temperature sensing means and connected to said exhaust area varying means for controlling the exhaust area to maintain a predetermined powerplant temperature, a fuel control means for said powerplant and means for alternatively transferring the connection of said regulating means from said exhaust area varying means to said fuel control means in response to an operating condition of said powerplant to maintain said predetermined powerplant temperature by regulation of fuel to said powerplant.

4. A control system for a thermal powerplant having a variable exhaust area, including means for sensing a temperature within said powerplant, regulating means connected for operation in response to said temperature sensing means, exhaust area varying means, a fuel regulating means for said powerplant, and means for sequentially connecting said regulating means to first control said exhaust area varying means and then to control said fuel regulating means in response to an operating condition of said powerplant to maintain a predetermined powerplant temperature as the output of said powerplant is raised.

5. A control system for a thermal powerplant having a variable exhaust area, including means for sensing a temperature within said powerplant, regulating means connected for operation in response to said temperature sensing means, exhaust area varying means, a fuel regulating means for said powerplant, and means for sequentially connecting said regulating means to first control said exhaust area varying means until attainment of maximum attainable exhaust area, and then to control said fuel regulating means to prevent the temperature of said powerplant from exceeding a predetermined maximum as the output of said powerplant is raised.

6. A control system for a thermal powerplant having a variable exhaust area and exhaust reheat fuel burners for augmentation of power output, comprising means for sensing a temperature within said powerplant, means for varying said exhaust area, a regulating means for actuating said exhaust area varying means in response to signals from said temperature sensing means to maintain a predetermined powerplant temperature, an exhaust reheat burner fuel flow control means and means operable upon full attainable opening of said exhaust area varying means for transferring connection of said regulating means from said exhaust area varying means to said fuel flow control means for regulating said powerplant temperature by control of exhaust reheat burner fuel flow.

7. In a thermal powerplant having a variable exhaust area, means for sensing a temperature within said powerplant, means for varying said powerplant exhaust area including a positioning motor, regulating means for energizing said positioning motor in response to signals received from said temperature sensing means to maintain predetermined powerplant temperatures, means for introducing fuel into said powerplant including a first fuel flow control means and a second fuel flow control means and means connecting said second fuel control means to override said first fuel control means, and means operable upon full attainable opening of said powerplant exhaust area for transferring connection of said regulating means from said nozzle area varying means to said second fuel control means to maintain the desired temperatures of said powerplant by control of fuel flow.

8. In an aircraft gas turbine having a variable area jet nozzle and reheat fuel burning for augmentation of thrust, a plurality of thermocouples positioned within said nozzle ahead of the point of introduction of reheat fuel for sensing turbine discharge temperatures, an electric nozzle area varying motor, a regulator connected to energize said motor in response to temperature signals received from said thermocouples, a reheat fuel controller including manual positioning means and a second positioning means and means connecting said second positioning means to override said manual positioning means, a limit switch associated with said variable area nozzle for actuation by said nozzle in the full open position, said limit switch being connected to transfer the connections of said regulator from said nozzle positioning motor to said second fuel controller positioning means for energization thereof in response to temperature signals from said thermocouples.

9. A control system for a gas turbine powerplant having a variable discharge nozzle area including a thermocouple for sensing a temperature within said powerplant, a first positioning motor for varying said discharge nozzle area, a second positioning motor for controlling a powerplant fuel input, a source of constant amplitude reference temperature signal voltage connected for comparison with the voltage of said thermocouple to obtain an error signal having a polarity dependent upon the direction of temperature variance from a desired temperature, an inverter for changing said error signal to a pulsating error signal having a magnitude corresponding to the magnitude of said error signal and a phase corresponding to the polarity of said error signal, means for amplifying said pulsating error signal and means to sequentially connect said amplifying means to energize said first and second positioning motors in directions respectively corresponding to the phase of said amplified pulsating error signal as the output of said powerplant is changed to maintain desired temperatures within said powerplant.

10. In an aircraft gas turbine powerplant having a variable area jet nozzle and reheat fuel burning for thrust augmentation, a plurality of temperature sensing thermocouples within said nozzle for sensing turbine discharge temperature, a source of reference signal voltage for comparison with the voltages of said thermocouples to obtain a temperature error signal voltage upon a deviation of the turbine discharge temperature from a desired temperature, the polarity of said error signal being dependent upon the direction of said deviation, an inverter for changing said error signal to a pulsating error signal having a phase corresponding to the polarity of said error signal, an amplifier connected for amplification of said pulsating error signal, a phase discriminator connected to cause energization of a first relay in response to a pulsating error signal of one phase and energization of a second relay in response to a pulsating error signal of another phase, a jet nozzle area varying positioning motor connected for energization by said relays to alternatively lower said turbine discharge temperature by opening said nozzle or to raise said turbine discharge temperature by closing said nozzle to maintain said desired temperature, a regulator for controlling reheat fuel input including a regulator positioning motor, a first limit switch actuatable on full opening of said nozzle for transferring the connection of said first relay from said nozzle positioning motor to said regulator positioning motor for lowering turbine discharge temperature by reducing the reheat fuel input, a second limit switch actuatable in positions other than the minimum reheat fuel input position of said regulator motor for transferring the connection of said second relay from said nozzle positioning motor to said regulator positioning motor for raising turbine discharge temperature by increasing the reheat fuel input.

11. In a gas turbine powerplant having a tailpipe reheat fuel burning for augmentation of thrust, means for varying the exhaust area of said tailpipe, means for sensing the discharge temperature of said gas turbine, regulating means connected between said temperature sensing means and said exhaust area varying means to maintain desired turbine discharge temperatures independently of the rate of reheat fuel flow by actuation of said exhaust area varying means, means for varying the rate of reheat fuel flow and means connected between said regulating means and said exhaust area varying means operative upon attainment of maximum attainable exhaust area opening for rendering said exhaust area varying means inoperative and for connecting said reheat fuel varying means to said regulating means for actuation thereby to maintain the desired turbine discharge temperatures.

References Cited in the file of this patent

UNITED STATES PATENTS

| Number | Name | Date |
|---|---|---|
| 2,113,164 | Williams, Jr. | Apr. 5, 1938 |
| 2,300,742 | Harrison et al. | Nov. 3, 1942 |
| 2,376,527 | Wills | May 22, 1945 |
| 2,411,895 | Poole | Dec. 3, 1946 |
| 2,457,595 | Orr, Jr. | Dec. 28, 1948 |
| 2,482,064 | Hornfeck | Sept. 13, 1949 |
| 2,482,065 | Hornfeck | Sept. 13, 1949 |
| 2,498,939 | Bobier | Feb. 28, 1950 |
| 2,514,248 | Lombard | July 4, 1950 |
| 2,516,909 | Redding et al. | Aug. 1, 1950 |
| 2,520,434 | Robson | Aug. 29, 1950 |
| 2,520,967 | Schmitt | Sept. 5, 1950 |
| 2,537,772 | Lundquist | Jan. 9, 1951 |
| 2,545,703 | Orr | Mar. 20, 1951 |
| 2,565,854 | Johnstone et al. | Aug. 28, 1951 |
| 2,566,373 | Redding | Sept. 4, 1951 |

FOREIGN PATENTS

| Number | Country | Date |
|---|---|---|
| 587,558 | Great Britain | May 7, 1947 |
| 588,502 | Great Britain | May 27, 1947 |